United States Patent [19]

Bannon

[11] Patent Number: 4,484,984
[45] Date of Patent: Nov. 27, 1984

[54] DISTILLATION WITH CONDENSATION PROCESS

[75] Inventor: Robert P. Bannon, Houston, Tex.

[73] Assignee: Shell Oil Company, Houston, Tex.

[21] Appl. No.: 497,374

[22] Filed: May 23, 1983

[51] Int. Cl.³ .............................................. B01D 3/14
[52] U.S. Cl. ........................................ 203/42; 203/39; 203/87; 203/98; 202/185 A; 208/349; 208/368; 208/369
[58] Field of Search ....................... 203/42, 87, 94, 98, 203/39, DIG. 9; 208/342, 348, 349, 357, 358, 368, 369; 202/185 A, 186, 182–184; 196/99, 140; 62/17, 29

[56] References Cited

U.S. PATENT DOCUMENTS

| | | | |
|---|---|---|---|
| 2,398,396 | 4/1946 | Powell | 203/87 |
| 2,915,462 | 12/1959 | Salmon | 202/185 A |
| 3,039,941 | 6/1962 | Sweeney et al. | 203/87 |
| 3,320,159 | 5/1967 | Potts | 203/87 |
| 3,401,093 | 9/1968 | Cox | 203/87 |
| 3,427,228 | 2/1969 | Constantikes et al. | 203/87 |
| 3,493,470 | 2/1970 | Irvin | 203/87 |
| 3,824,177 | 7/1974 | Honerkamp et al. | 203/42 |
| 4,235,706 | 11/1980 | Bannon | 203/87 |

Primary Examiner—Wilbur Bascomb
Attorney, Agent, or Firm—Albert J. Adamcik

[57] ABSTRACT

A process for the distillation and condensation of a multi-component liquid is described, the process being characterized by the utilization of a portion of the condensate in achieving increased separation of components of no-condensed vapor. In a principal embodiment, the overhead from a distillation column is cooled, condensing a portion thereof, and the condensed portion is accumulated in an accumulation zone. A first liquid stream is removed from the accumulation zone for reflux, while a second liquid stream is cooled, and then contacts, in a separate zone, the uncondensed portion of the overhead. The contacting absorbs and condenses components of the vapor, and the second liquid and absorbed components are collected in the accumulation zone.

14 Claims, 2 Drawing Figures 4,484,984

DISTILLATION WITH CONDENSATION PROCESS

BACKGROUND OF THE INVENTION

Rapid escalation of energy costs in recent years has spurred efforts to improve efficiency in plant operations. Distillation practices have received great attention, since the process of distillation, the predominant unit opertation in the oil refining and chemical industries, consumes prodigious amounts of energy.

In the typical distillation column, the operating pressure is set so that overhead vapor may be condensed with the available cooling medium, usually cooling water or air. Normally, it is advantageous to keep the pressure as low as possible to increase the relative volatility of the feed components and thus lessen the reflux required for a given separation. As a consequence, the top product from the column is relatively cool; typically, only 20°-40°F. above the temperature of the cooling medium. If this product must be further processed at a higher temperature, for example, by further distillation, it must be reheated. The present invention seeks to conserve energy present in the vapor fraction from the distillation, and thereby reduce the overall energy consumption of the procedure. In those cases where refrigeration is used in condensation, the present invention reduces refrigerant requirements.

SUMMARY OF THE INVENTION

Accordingly, the invention, in one embodiment, relates to a process comprising
(a) condensing a condensable vapor in a condensation zone having at least one condensation stage, and producing a condensation zone effluent comprising vapor and liquid;
(b) recovering and separating vapor and liquid from the condensation zone, and accumulating liquid in an accumulation zone;
(c) removing a liquid stream from said accumulated zone, and cooling said liquid stream to a temperature of at least 10° F. below the temperature of the liquid in the accumulation zone, and producing a cooled second liquid
(d) passing vapor separated in step (b) to a contacting zone, and contacting said vapor with the cooled second liquid to condense and absorb components of said vapor in said second liquid and produce a combined liquid, and collecting the combined liquid in the accumulation zone.

Preferably, liquid is removed from the accumulation zone for reflux if a distillation column is providing the vapor for condensing, and a product stream is removed. In a second embodiment, where the vapor is a mylticomponent mixture, step (a) may comprise the final condensation stage in a series of stages, the previous stages preferably having a separate accumulation zone and providing reflux for a distillation column providing the vapor stream. In each case the condensate may be collected in or after all, or fewer than all, of the condensation stages employed. As used herein, the term "condensation stage" or "stages", or variants thereof, refers to units or apparatus, individually or collectively, employed in converting vaporous material, under suitable conditions of temperature and pressure, to liquid. Collected liquids may be individually or collectively passed to one or more accumulation zones, each zone having a number of sections separated by barriers. The number of sections is equal to or less than the number of liquids passed to the particular accumulation zone.

The invention may be applied to any vapor suitable for condensation. For example, the invention may be utilized for condensing vapors from crude oil distillation processes, and for condensing products from conversion processes such as catalytic cracking, hydrocracking, and delayed coking. The invention is preferably utilized in conjunction with the distillation processes in which the top product separated is a gasoline fraction. The top product is preferably a mulit-component mixture, with a reasonable temperature differential, e.g., at least 20° F., preferably from 20° F. to 225° F., between its dew point and bubble point. In this case, one or more condensation stages, as indicated, may be employed before the condensation procedure of the invention. However, the invention is also suitable for separations of substantially pure product, for example, the separation of isopentane from n-pentane. In such cases, no particular advantage accrues from the use of the procedure as described in the second embodiment. The particular conditions applied, i.e., pressure, temperature, throughout, etc., are those applicable to condensation processes, and are well understood by those skilled in the art. Whatever the case, a key feature of the invention is the use of a portion of the liquid from the accumulation zone, after cooling, to assist in removal of additional components from the vapor exiting the separation or accumulation zone. By cooling only a limited volume of this liquid, energy requirements of further processing steps may be reduced. Where refrigeration is used for condensaton, refrigeration requirements are reduced.

DETAILED DESCRIPTION OF THE INVENTION

In order to describe the invention in greater detail, reference is made to the accompanying schematic drawing.

FIG. 1 illustrates the general concept of the invention, while

Figure 1:
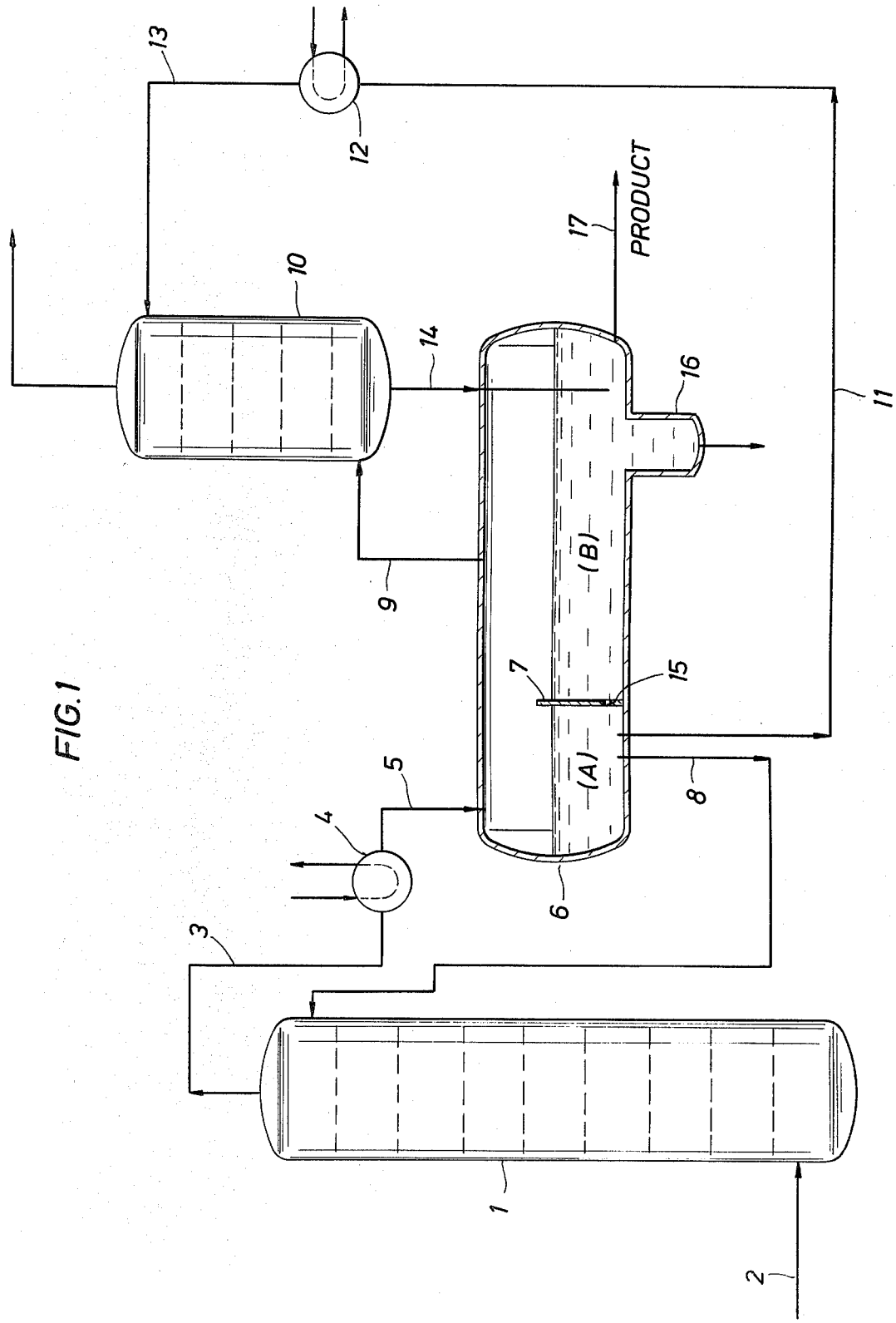

In FIG. 1, the liquid-vapor stream from the condensation stage is separated in the first accumulation section of the accumulating zone, although those skilled in the art will recognize that at least some of the phase separation may be made before entry of the stream into the accumulating zone. Moreover, the invention will be described with use of the accumulation zone of my previous patent U.S. Pat. No. 4,235,706, issued Nov. 25, 1980, whose disclosure is incorporated herein by reference, although those skilled in the art will recognize that a non-partitioned zone may be employed.

More particularly, numeral (1) designates a distillation column, preferably a fractionating column for a naphtha top product. In accordance with the invention, vapor streams from other sources may be employed, as will be understood by those skilled in the art. The feed enters column (1) through line (2), and is fractioned in a known fashion. Overhead vapor exits column (1) through line (3) at a temperature of about 340° F. and is passed to condensor (4) where a portion of the vapor is condensed. Condenser (4) may be a single unit or multiple units, and some liquid may be removed and treated, as desired. Again, condensor (4) may simply by the last of a series of condensers. For purposes of this illustration, the overhead is assumed to have a condensation range of about 200° F., e.g., to condense between 340° F. and 140° F. at column operating pressure. The amount condensed is that sufficient to provide top product and reflux for column (1), while at the same time providing for enhanced heat recovery of the energy utilized in the distillation. Those skilled in the art may readily determine the amount to be condensed for adequate reflux of the distillation column. Any suitable type of condensation heat exchange system may be employed, as will also be evident to those skilled in the art. Preferably, the vapor may be partially condensed, either by indirect heat exchange with another process stream, by air cooling, or by direct contact with condensate that has been cooled by exchange.

From unit (4), the vapor-liquid stream is passed through line (5) to accumulating zone (6). The external design of accumulating zone (6) may vary considerably, but preferably the zone comprises a barrier (7) which divides the zone into two separate liquid-containing sections or vessels, there being only limited liquid communication between the two sections, as will be illustrated later. At the same time, barrier (7) is constructed so that is does not limit vapor flow in accumulating zone (6) where liquid separates out in the phase separation, accumulation section (A) formed by the walls of unit (6) and barrier (7). Vapor is free, however, to occupy the enitre open volume of unit (6). The temperature of liquid in section (A) will be approximately 190° F. Liquid from section (A) is returned via line (8) to column (1) to provide the reflux mentioned previously.

Vapor from zone (6) is passed through line (9) to vent contactor (10). Concomitantly, a stream of liquid from section (A) is withdrawn via line (11) and forwarded, via cooler (12) and line (13), to contactor (10). Those skilled in the art will recognize, that, if it is desired to use a single pump, line (8) may serve as the withdrawal line, line (11) merely joining (8) at a suitable connection. Cooler (12) serves to cool stream (11) to a temperature of about 100° F. In general, the stream in (11) should be cooled from about 10° F. to about 100° F. below its temperature in the accumulation zone. As indicated, the cooled stream in line (13), upon entry into contactor (10), serves to absorb and condense additional components from the vapor. Contactor (10) may be of any suitable type, but is preferably a small tray contactor having, e.g., 3 to 5 trays. The vapor leaving contactor (10) suitably has a temperature of from 100° to 120° F. As illustrated, the liquid recovered in contactor (10) i.e., condensate, absorbed vapor, and liquid from line (13), passes or flows to, and collects in, the accumulating section (B) of zone (6) through a sealed dip leg (14). Dip leg (14) counterbalances the pressure drop between zone (6) and contactor (10) that causes vapor flow in line (9). Any "non-condensables" from vent contactor (10) may be processed by conventional techniques. While a minor portion of the vapor in the open space above section (B) will condense, such condensation is not of major significance.

The volume or quantity of liquid removed via line (11) will range from 5 percent to 50 percent by weight of the liquid condensate in line (5). The amount is dependent on the temperature, composition, and amount of vapor flowing to contactor (10), and the allowable flow of "non-condensables" from the top of contactor (10). The proper amount may be readily determined by one skilled in the art.

As indicated, the barrier separating zone (6) into two sections is limited so that the sections have open vapor communication to allow vapor flow and pressure equalization between the sections. Barrier (7) is provided further with an opening (15) near or at the bottom thereof, for liquid level balance and for flow of heavy second liquid phase to a boot (16) for separate draw-off. The size of the opening is determined by the volumes of liquid to be balanced, keeping in mind that significant mixing of the liquids in sections (A) and (B) is not desired. The "opening" may, as will be understood by those skilled in the art, be a multiplicity of smaller openings, the total cross-sectional area of the openings being such as to fulfill the requirements noted. In the illustration, given an accumulating vessel or zone having the dimensions 12 ft. in diameter by 20ft. tangent to tangent, opening (15) may be simply a hole 6 inches square. Barrier (7) may be constructed of any suitable impermeable material, such as steel or ceramic, and the opening should be baffled to prevent convection flow. Barrier (7) may be insulated to reduce heat flow from section (A) to section (B).

Figure 2:
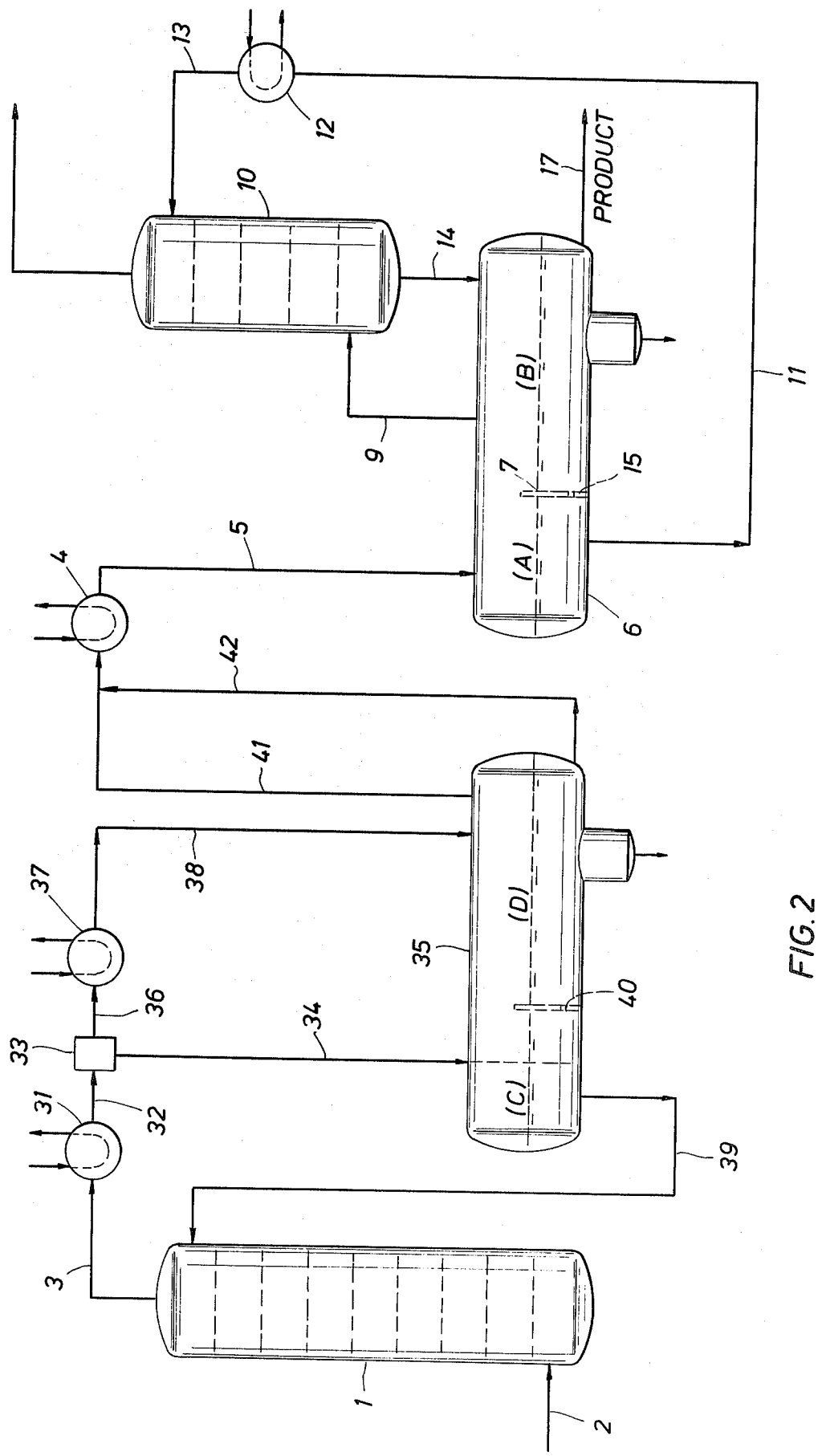
FIG. 2 represents a preferred manner of utilization. All values mentioned are calculated or exemplary.

In FIG. 2, similar numbers represent similar features. As illustrated, the procedure of FIG. 2 employs the accumulator or accumulation techniques of my aforementioned patent, although this is not critical. Accordingly, the feed enters a column (1) through line (2), and is fractionated in a manner known to those skilled in the art. The overhead vapor fraction in line (3), at a temperature of about 380° F., is condensed in a series of condensation stages. Condenser means (31), which may be one or more stages, may comprise shell and tube heat exchangers in which heat is transferred to a cooler process steam, e.g., the feed to column (1). Preferably, the overhead fraction is cooled to about 350° F, thus condensing an amount approximately equal to ⅔ of the reflux flow to column (1), although more or less than this amount of condensate is acceptable. More particularly, the overhead fraction enters unit (31) where the said portion of the fraction is condensed. The effluent from (31) passes via line (32) to separator (33) where liquid is separated from vapor. Separator (33) may be integrated with or immediately follow unit (31). Liquid is forwarded by line (34) to section (C) of accumulator (35), accumulator (35) conforming generally to the requirements described in my aforementioned patent. Vapor from separator (33) is forwarded via line (36) to condensor (37) where further condensation takes place. Effluent from unit (37), i.e., liquid and vapor, are forwarded in line (38) to section (D) of accumulator (35). Other multiple stage schemes may be employed, and those skilled in the art may adjust the temperatures and pressures in units (31) and (37) to provide the control desired. Preferably, sufficient liquid is condensed in the combination of units (31) and (37) to provide reflux for column (1) [supplied by line (39)] and a portion of the product.

Vapor is separated from liquid in section (D) of accumulator (35), liquid flow occurring between sections (C) and (D) by virtue of opening (40). Vapor is removed from accumulator (35), and forwarded via line (41) to condenser (4). Those skilled in the art will realize that the vapor-liquid stream from unit (37) may be separated in a separate unit instead of accumulator (35), with the liquid directed to accumulator (35) and the vapor to condenser (4). Prior to entry of the vapor in line (41) into condenser (4), a stream of liquid from line (42) is preferably injected into the vapor. The liquid is that a portion of product, if any, that is condensed in units (31) and (37) and is taken from section (D) of accumulator (35).

Accordingly, a stream of both vapor and liquid enters condenser (4) and is treated as described in relation to FIG. 1. Operation of the rest of the units illustrated corresponds substantially to the procedure employed in connection with FIG. 1. In this case, however, flow is substantially only product, whereas in FIG. 1, condenser (4) flow comprises both reflux and product.

What is claimed is:

1. A process comprising:
   (a) distilling a multi-component liquid in a distillation column under conditions effective to provide an overhead fraction having a temperature differential of at least 20° F. between its dew point and its bubble point;
   (b) condensing a portion of the overhead fraction in a condensation zone having at least one condensation stage, producing a condensation zone effluent comprising vapor and liquid;
   (c) removing condensation zone effluent from the condensation zone and separating the liquid from the condensation zone effluent to produce a condensation zone effluent vapor, and accumulating said liquid in an accumlation zone;
   (d) removing a first liquid stream from said accumulation zone, and utilizing said first liquid stream as reflux in said distillation column;
   (e) removing a second liquid stream from said accumulation zone, and cooling said stream to a temperature of at least 10° F. below the temperature of the liquid in said accumulation zone, and producing a cooled removed liquid;
   (f) passing condensation zone effluent vapor from step (c) to a contacting zone, and contacting said condensation zone effluent vapor with the cooled removed to condense and absorb components of said vapor in said cooled removed liquid and produce a combined liquid, and collecting the combined liquid in the accumulation zone.

2. The process of claim 1 wherein the second liquid stream of step (e) is cooled to a temperature of from about 10° F. to about 100° F. below the temperature of the liquid in the accumulation zone.

3. The process of claim 2 wherein the multi-component liquid is a crude oil.

4. The process of claim 1 wherein the vapor and liquid in the condensation zone effluent are separated in the accumulation zone.

5. The process of claim 4 wherein the accumulation zone comprises a first accumulation section and a second accumulation section having vapor communication with the first accumulation section but being separated from said first accumulation section by a barrier which provides limited flow of liquids between the first accumulation section and the second accumulation section, the first accumulation section and the second accumulation section being at different liquid temperatures, and wherein the vapor and liquid from the condensation zone effluent are recovered and separated in the first accumulation section.

6. A process comprising:
   (a) distilling a multi-component liquid in a distillation column under conditions effective to provide an overhead fraction having a temperature differential of at least 20° F. between its dew point and its bubble point;
   (b) condensing of the overhead fraction in a first condensation zone having at least one condensation stage, producing a first condensation zone effluent comprising liquid and vapor, and removing liquid and vapor from said first condensation zone and collecting said liquid and vapor in a first accumulation zone, said accumulation zone comprising at least a first accumulation section and a second accumulation section having vapor communication with the first accumulation section but being separated from said first accumulation section by a barrier for liquid, the first accumulation section and the second accumulation section being at different liquid temperatures;
   (c) removing a first liquid steam from said first accumulation section, and utilizing said first liquid stream as reflux in said distillation column;
   (d) passing a vapor stream from the first accumulation zone to a second condensation zone, and condensing a portion of said vapor steam in said second condensation zone and producing a second condensation zone effluent comprising a second vapor and a second liquid;
   (e) removing second condensation zone effluent from the second condensation zone and separating second liquid from said second condensation zone effluent to produce a second condensation zone effluent vapor, and accumulating second liquid in a third accumulation section is a second accumulation zone, said second accumulation zone comprising said third accumlation section and a fourth accumulation section having vapor communication with the third accumulation section but being separated from said third accumulation section by a barrier which provides limited flow of liquids between the third accumulation section and the fourth accumulation section, the third accumulation section and the fourth accumulation section being at different liquid temperatures, removing a second light stream from said third accumulation section, and cooling said stream to a temperature of at least about 10° F. below the temperature of the liquid accumulation section, and producing a cooled removed liquid;
   (g) passing second condensation zone effluent vapor from step (e) to a contacting zone, and contacting said second condensation zone effluent vapor with cooled removed liquid to condense and absorb components of said second condensation zone effluent vapor in said cooled removed liquid and produce a combined liquid, and collecting the combined liquid in the fourth accumulation section.

7. The process of claim 6 wherein the second liquid stream of step (f) is cooled to a temperature of from about 10° F. below the temperature of the liquid in the third accumulation section.

8. The process of claim 7 wherein the multi-component liquid is a crude oil.

9. The process of claim 6 wherein the second vapor and second liquid in the second condensation zone effluent are separated in said third accumulation section of said second accumulation zone.

10. The process of claim 9 wherein the limited flow of liquids is through an opening in the barrier sized to achieve liquid balance without significant mixing of liquids between the sections.

11. A process comprising:

(a) distilling a multi-component liquid in a distillation column under conditions effective to provide an overhead condensable vapor;

(b) condensing a portion of the vapor in a condensation zone, producing a condensation zone effluent comprising vapor and liquid;

(c) removing condensation zone effluent from the condensation zone and separating the liquid from the condensation zone effluent to produce a condensation zone effluent vapor, and accumulating said liquid in an accumulation zone;

(d) removing a first liquid stream from said accumulation zone, and utilizing said first liquid stream as reflux in said distillation column;

(e) removing a second liquid stream said accumulation zone, and cooling said stream to a temperature of at least about 10° F. below the temperature of the liquid in said accumulation zone, and producing a cooled removed liquid;

(f) passing condensation zone effluent vapor from step (c) to a contacting zone, and contacting said condensation zone effluent vapor with the cooled removed liquid to condense and absorb components of said condensation zone effluent vapor in said cooled removed liquid and produce a combined liquid, and collecting the combined liquid in the accumulation zone.

12. The process of claim 11 wherein the said second liquid stream of step
   (e) is cooled to a temperature of from about 10° F. below the temperature of the liquid in the accumulation zone.

13. The process of claim 11 wherein the vapor and liquid in the condensation zone are separated in the accumulation zone.

14. The process of claim 13 wherein the accumulation zone comprises a first accumulation section and a second accumulation section having vapor communication with the first accumulation section but being separated from said first accumulation section by a barrier which provides limited flow of liquids between the first accumulation section and the second accumulation section, the first accumulation section and the second accumulation section being at different liquid temperatures, and wherein the vapor and liquid from the condensation zone effluent are recovered and separated in the first accumulation section.

* * * * *